United States Patent [19]
Wardall

[11] Patent Number: 5,098,137
[45] Date of Patent: Mar. 24, 1992

[54] DEVICE FOR FACILITATING KNOT TYING

[76] Inventor: Thad E. Wardall, 1020 W. Lake Sammarrish, NE., Bellevue, Wash. 98008

[21] Appl. No.: 708,236

[22] Filed: May 31, 1991

[51] Int. Cl.$^5$ .............................................. D03J 3/00
[52] U.S. Cl. ................................................. 289/17
[58] Field of Search ........................... 289/2, 17, 18.1

[56] References Cited

U.S. PATENT DOCUMENTS

| | | | |
|---|---|---|---|
| 280,921 | 7/1883 | Fay | 289/17 |
| 2,697,624 | 12/1954 | Thomas et al. | 289/17 |
| 2,758,858 | 8/1956 | Smith, Sr. | 289/17 |
| 2,825,592 | 3/1958 | Semple | 289/17 |
| 3,106,417 | 10/1963 | Clow | 289/17 |
| 3,630,555 | 12/1971 | Newlin | 289/17 |
| 3,837,691 | 9/1974 | Smythe | 289/17 |
| 4,101,152 | 7/1978 | Gardipee | 289/17 |
| 4,660,314 | 4/1987 | Janssen et al. | 289/17 |
| 4,864,762 | 9/1989 | Cox | 289/17 |
| 5,020,833 | 6/1991 | Wardall | 289/17 |

Primary Examiner—Andrew M. Falik
Assistant Examiner—Michael A. Neas
Attorney, Agent, or Firm—Robert W. Jenny

[57] ABSTRACT

The device facilitates tying a variety of knots similar to the commonly termed nail or tube knot. It is flat and generally rectangular with a hole at one end and a fork at the other. The fork is two-tined, narrower than the remainder of the device and centered widthwise on it. The profile change from full width to fork width forms angled shoulders at the base of the tines. The depth of the slot between the tines is greater than the distance from the tips of the tines to the junctures of the shoulders and the tines by an amount at least equal to the width of the slot between the tines. There is a second slot called the side slot, normal to one of the long edges of the device, with a depth in the range of ¼ to ½ the width of the device, ⅓ being preferred. In a preferred embodiment the device is ⅜ of an inch wide, 0.060 of an inch thick and 2 inches long with the fork occupying ¼ of the length.

2 Claims, 2 Drawing Sheets

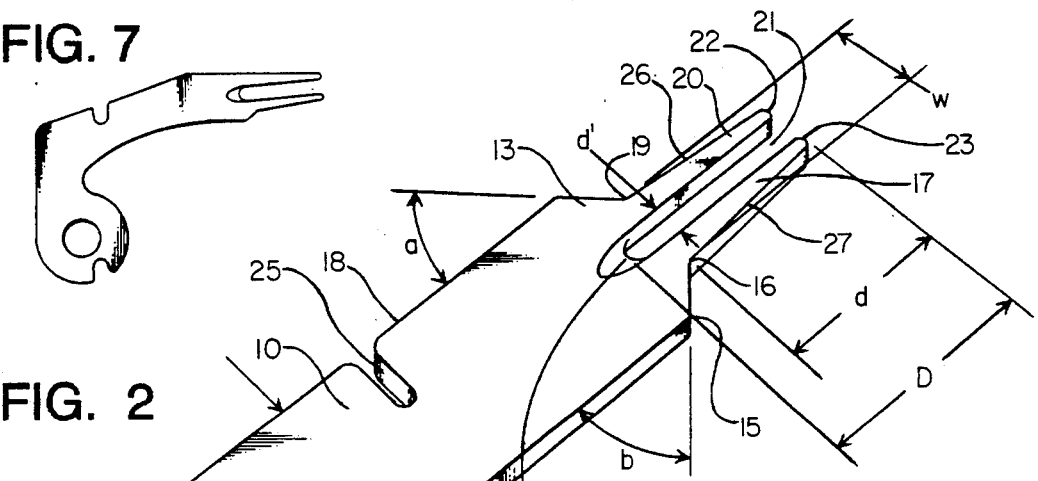
FIG. 7
FIG. 2
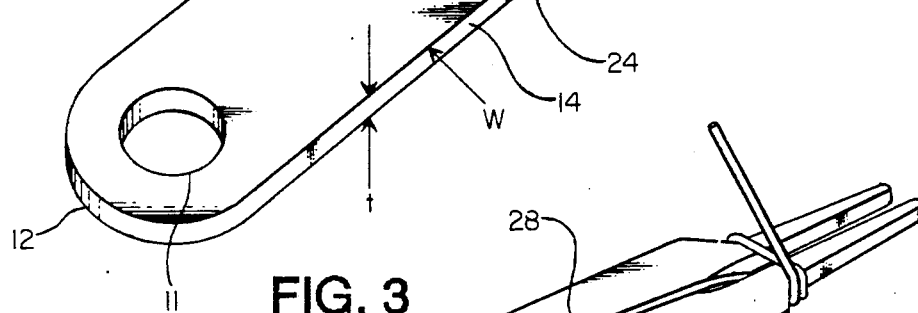
FIG. 3
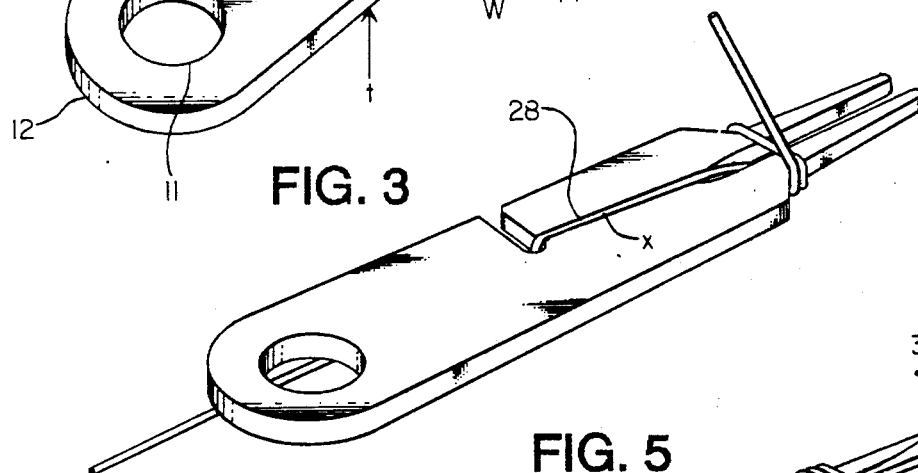
FIG. 5
FIG. 4
FIG. 6
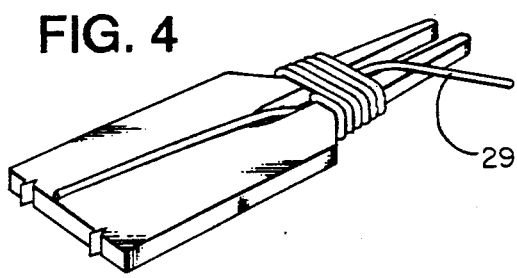

DEVICE FOR FACILITATING KNOT TYING

BACKGROUND OF THE INVENTION

1. Field

The subject invention is in the field of handheld tools, specifically those used by sport anglers. More specifically it is in the field of such tools used to help with tying knots in, between and to lines, leaders, hooks and lures.

2. Prior Art

The known prior art to the subject invention is the TIE-FAST Knot Tyer, manufactured by Sierra Stream and Mountain, P.O. Box 7693, Chico, CA 95927, U.S. Pat. No. 3,106,417. This tyer is widely sold and used and serves its intended purposes well. It is made of stainless steel which is die cut and then formed. Accordingly, it is relatively expensive, with the retail selling price in the range of $4.00 to $6.00. Accordingly, a prime objective of the subject invention is to provide a knot tying device which serves the same purposes as the prior art tool, serves them as well or better, is more compact, costs considerably less to manufacture and sells for less. A knot tying device incorporating all the basic features of the subject device was shown as an attachment to the apparatus disclosed in a U.S. patent application by the subject inventor, Ser. No. 07/489,347, filed 03/06/90, now U.S. Pat. No. 5,020,833, but was not claimed in that application.

SUMMARY OF THE INVENTION

The subject device facilitates tying knots and, in the preferred embodiment, is made of flat, stiff plastic, and is about 2 inches long, ⅜ of an inch wide and 0.060 of an inch thick. In plan view one end is rounded with a hole at the center of the end radius. The hole is for attachment of a lanyard or the like to prevent loss of the device and make the device easier to find and bring to hand. The other end of the device is a two-pronged fork. The width of the fork is about ½ the width of the tool and the fork is centered on the end about the longitudinal centerline of the tool. The length of the fork, i.e. the length of its tines, is in the range of 2 to 2.5 times its width. The outside edges of the fork and the tines are slightly tapered and become narrower toward the end of the tool. The transition shapes between the edges of the fork and the edges of the wider portion of the device form shoulders that are at angles to the longitudinal centerline in the range of 30 degrees to 80 degrees. The shoulders are located such that their intersections with the tines of the fork are closer to the ends of the tines than the end of the slot between the tines by a distance in the range of 1 to 1.5 times the average width of the slot. In plan view the end of the slot is radiused. When viewed in section along the longitudinal centerline of the tool, the radiused end of the slot is tapered from approximately ½ the thickness of the device toward the hole at an angle ranging from 10 degrees to 45 degrees. There is another slot, called the side slot, in the device at a right angle to its longitudinal axis to a depth of between ¼ and ½ the width of the device and at a distance from the ends of the tines in the range of 2 to 4 times the length of the tines, 2.5 times being preferred.

The device is used to facilitate the tying of any and all of the variety of knots used to join two separate strands of line or leader in which one strand is wound or wrapped around and secures the other strand as typified by the common terms nail knot or tube knot, in which nails or tubes are commonly used to assist in the knot tying process. Using the subject device to fasten a leader to a fly line, the leader is first set in the side slot and anchored by thumb pressure, the device being held between the thumb and forefinger with the fork exposed. Then the leader is passed between the tines and wrapped several times, usually 5 or 6, around the tines with each wrap started by sliding it down the angled shoulders such that previous wraps are pushed along the tines as each new wrap is added. When the wraps are complete the tag end of the leader is inserted through the wraps and between the tines in the direction of the extension of the tines. This is facilitated by the fact that the bottom or end of the slot between the tines is farther from the ends of the tines than the junctures of the shoulders with the tines, the junctures determining the location of the wraps. The tag end of the leader is then secured between the user's forefinger and second finger while the fly line is inserted through the wraps and between the tines in the direction from the ends of the tines toward the end of the slot between the tines. The end of the fly line may be held under the thumb holding the device if its thickness allows it to be inserted past the end of the slot. To complete the knot, the leader is pulled away from the fork gently and the wraps are inspected and aligned if necessary. A firm tug on the tag end of the leader pulls the wraps from the tines onto the fly line forming the knot around the fly line beyond the end of the tines. The knot is tightened and the tag ends of the fly line and leader are then trimmed.

The preferred embodiment is made of plastic, such as nylon, which is semi-rigid and has the ability to flex when stressed. This characteristic of plastic improves the effectiveness of the device. If the leader is wrapped tightly around the tines of the fork, the ends of the tines will bend slightly toward each other. When using fly lines with relatively large diameters, the user may not be able to insert them all the way past the end of the slot between the tines. In such instances the fly line need only be wedged in between the flexible tines as necessary to secure them in place while the knot is being completed. This aspect of the device allows the fork and its tines to be kept relatively narrow, while remaining capable of accommodating a wide range of fly line and leader diameters. Keeping the fork narrow improves the device's optimal performance by ensuring that the leader's wraps remain evenly aligned as they are pulled onto the fly line. For functional and aesthetic reasons, the even alignment of the leader's wraps around the fly line is an important characteristic of this type of knot.

A second embodiment of the subject device is shown in the subject applicant's U.S. patent application, Ser. No. 07/489,347, as an attachment to a separate apparatus. This second embodiment incorporates the basic features and dimensions of the fork in the preferred embodiment, but the second embodiment has a shoulder on only one side of the fork and the second embodiment's other elements are configured differently to facilitate attachment to the apparatus. The second embodiment functions essentially the same as the preferred embodiment for purposes of tying the subject knots.

BRIEF DESCRIPTION OF THE DRAWINGS

FIG. 2 is a perspective view of the preferred embodiment of the device with the elements of the device identified.

FIG. 3 is a perspective view of the preferred embodiment of the device showing one wrap of the leader around the tines of the fork.

FIG. 4 is a perspective view of the forked end of the preferred embodiment of the device with 5 wraps of the leader formed and the tag end of the leader inserted between the tines and through the wraps.

FIG. 5 is a perspective view of the forked end of the preferred embodiment of the device with 5 wraps of the leader formed, the tag end of the leader inserted through the wraps, and the fly line inserted between the tines and through the wraps of the leader.

FIG. 6 is a view of the finished knot completed with the tag ends of the leader and fly line trimmed close to the knot.

FIG. 7 is a view of a second embodiment of the device attachable to another apparatus such as the apparatus previously referenced under the U.S. patent application, Ser. No. 07/489,347, filed 03/06/90.

DETAILED DESCRIPTION OF THE INVENTION

Figure 1:
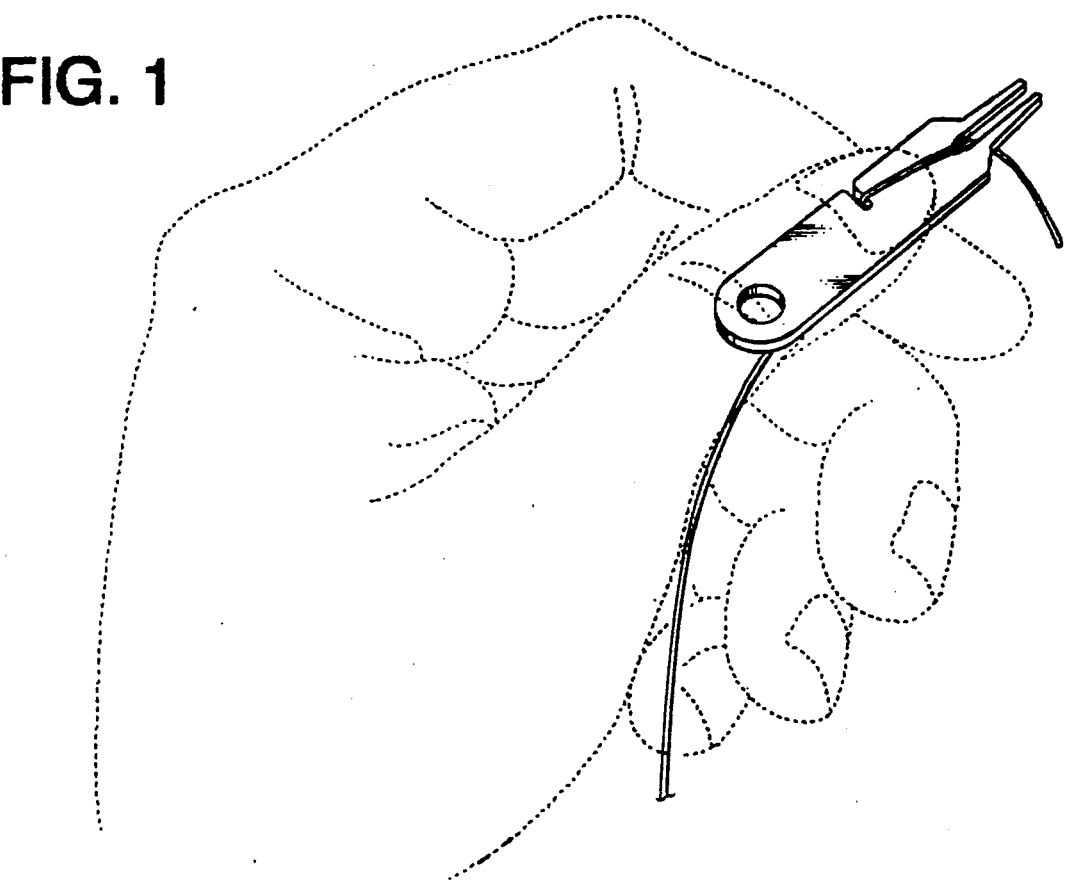
FIG. 1 is a perspective view of the preferred embodiment of the device in the hand with one strand of fishing leader in position to illustrate the beginning of the knot tying process.

The subject invention is a device which assists in the tying of specific kinds of knots used in sport fishing which involve several loops or wraps of line, fishing leader or the like termed strands for purposes of this disclosure. As shown in FIG. 1 and FIG. 2, the device 10 is one piece of material, preferably plastic. The preferred embodiment is in the shape of an elongated rectangle with a hole 11 near one end 12 with that end radiused with the centers of the radius and holes coincident and with the other end 13 forked. The size of the device is indicated by reference to the size of the fingers in which it rests in FIG. 1. The width w of the fork is in the range of 0.4 to 0.6 the width W of the device with 0.5 preferred. Edge 14 of the device tapers from corner 15 to juncture 16 with tine 17 of the forked end, forming a shoulder. Similarly edge 18 tapers to juncture 19 forming a shoulder to the other tine 20. Angles of taper a and b to the longitudinal axis of the device are equal and in the range of 30 degrees to 80 degrees, 45 degrees being preferred. Depth D of slot 21 between the tines exceeds distance d from the tips 22 and 23 of the tines to the juncture by an amount at least equal to the distance d1 between the tines nearest the end 24 of the space (slot 21) between the tines. The depth of slot 21 is in the range of 6 to 12 times distance d1, 10 being preferred. The radiused end 24 of the slot 21 is tapered from approximately ½ the thickness t of the device toward the hole 11 at an angle to the longitudinal axis ranging from 10 degrees to 45 degrees. There is a side slot 25 at a right angle to edge 18, extending into the device a distance in the range of ¼ to ½ the width W. Side slot 25 is located a distance from the ends of the tines in the range of ⅓ to ⅔ the total length of the device. The width of sideslot 25 is in the range of 1/32 to 3/32 of an inch. The thickness t of the device is dictated by the diameters of the largest lines the device must accommodate. The thickness t is in the range of 0.03 to 0.12 of an inch with 0.06 of an inch preferred. During normal usage the device is held in the user's hand with the forked end pointing away from the user and the tapered end 234 of the slot 21 facing upward as shown in FIG. 1. The device may be held in either the user's right or left hand, as it makes relatively little difference whether the side slot 25 is positioned toward or way from the user. The outside edges 26 and 27 of the tines taper gradually from their junctures 16 and 19 with the angled shouledres toward the ends 22 and 23 of the tines. The slot 21 widens gradually from its radiused end 24 toward the ends 22 and 23 of the tines 17 and 20. This tapered configuration facilitates movement of wraps or loops of strands along the tines during the typing and transfer of knots as explained below.

The tying of the commonly termed nail or tube knot is explained here to illustrate the general principles of using the subject device. Referring to FIG. 3 a leader 28 is inserted in the side slot and held at X by thumb pressure while the knot is tied. Referring to FIG. 3 and FIG. 4 the leader is then set into the slot between the tines, carried under a tine and wrapped several times, usually 5 or 6, around both tines with each wrap positioned against and sliding down the angled shoulders to their junctures with the tines. As new wraps are added, preceding wraps are pushed along the tines by the interaction of the shoulders and the leader. When the wraps are completed the tag end 29 of the leader is passed between the tines and through the loops formed by the wraps and may be held in position by clamping the tag end 29 between the forefinger and the second finger of the hand holding the device. Referring to FIG. 5, the end of the fly line 30 is then inserted through the loops and between the tines. If the fly line is small enough in diameter to extend beyond the end 24 of the slot 21, then it may be held in position by clamping it between the thumb and the device at X. If the fly line is too large in diameter to be inserted fully through the loops as shown in FIG. 5, then it may be wedged between the flexible tines only to hold it in position. The knot is transferred from the device to the fly line alone by firmly and quickly pulling on the tag end 29 while continuing to clamp the leader between the thumb and the device at X. This sudden tension on the tag end causes the loops of the leader to slide down and off the tapered tines and onto the fly line. After the leader's loops are properly aligned on the fly line, the knot can be tightened and the ends of the leader and fly line trimmed to form the completed knot as illustrated in FIG. 6.

A second embodiment of the device is illustrated in FIG. 7. This second embodiment was represented as an attachment to a separate apparatus disclosed by the subject inventor in U.S. patent application Ser. No. 07/489,347, filed 03/06/90, but was not claimed in that application. This second embodiment is a reconfiguration of the preferred embodiment wherein the general features and dimensions of the forked end of the preferred embodiment have been retained while other elements of the device have been modified to facilitate attachment to the separate apparatus.

It is considered understandable from this description that the subject invention meets its objectives. It is simple, compact and inexpensive to manufacture and improves upon the knot tying facilitation purposes of known prior art devices.

It is also considered to be understandable that while a preferred embodiment of the device is described herein, other embodiments and modifications of the one described are possible within the scope of the invention which is limited only by the attached claims.

I claim:

1. A device for facilitating tying knots with at least one strand, said device being flat and generally rectangular and having a first length, a first width, a thickness, a first end, a second end, first and second long edges and a longitudinal axis, said device further comprising:
   a fork at said first end, said fork having first and second tines with a first slot between them and a second width, said second width being in the range of 0.4 to 0.6 of said first width, each of said tines having a second length and an end, said first slot having a depth and a third width, said third width being in the range of 0.03 to 0.08 inches and said depth being in the range of 6 to 12 times said third width,
   said device further comprising first and second profiles, said first profile joining said first long edge to said first tine and said second profile joining said second long edge to said second tine, said first and second profiles being first and second shoulders, each at an angle to said longitudinal axis in the range of 30° to 80°, said first and second shoulders joining said tines at first and second junctures, said first and second junctures being at a distance from said ends of said tines, said distance being less than said depth by at least 1 times said third width.

2. The device of claim 1 further comprising a side slot, said side slot being at a right angle to said first long edge and having a depth in the range of ¼ to ½ of said first width and a fourth width in the range of 1/32 to 3/32 of an inch.

* * * * *